United States Patent
Blee et al.

(10) Patent No.: US 11,435,292 B2
(45) Date of Patent: Sep. 6, 2022

(54) MULTIVARIATE SPECTRAL ANALYSIS

(71) Applicant: ROLLS-ROYCE plc, London (GB)

(72) Inventors: Astrid L Blee, Stroud (GB); David A Megson-Smith, Bristol (GB)

(73) Assignee: ROLLS-ROYCE PLC, London (GB)

(*) Notice: Subject to any disclaimer, the term of this patent is extended or adjusted under 35 U.S.C. 154(b) by 0 days.

(21) Appl. No.: 17/213,060

(22) Filed: Mar. 25, 2021

(65) Prior Publication Data

US 2021/0302319 A1 Sep. 30, 2021

(30) Foreign Application Priority Data

Mar. 27, 2020 (GB) ..................... 2004459

(51) Int. Cl.
| | |
|---|---|
| *G01J 3/44* | (2006.01) |
| *G01N 21/77* | (2006.01) |
| *G01J 3/28* | (2006.01) |
| *G01N 21/65* | (2006.01) |

(52) U.S. Cl.
CPC ............ *G01N 21/77* (2013.01); *G01J 3/2823* (2013.01); *G01J 3/4406* (2013.01); *G01N 21/65* (2013.01)

(58) Field of Classification Search
CPC ........ G01N 21/77; G01N 21/65; G01N 21/31; G01N 21/64; G01N 2201/1293; G01J 3/2823; G01J 3/4406; G01J 3/44; G01J 3/42; A61B 5/0075
See application file for complete search history.

(56) References Cited

U.S. PATENT DOCUMENTS

| | | | |
|---|---|---|---|
| 7,840,626 B1 | 11/2010 | Keenan | |
| 2019/0204230 A1* | 7/2019 | Ota | ........................ G16C 20/70 |

OTHER PUBLICATIONS

Sep. 29, 2020 Search Report issued in Great Briain Patent Appliation No. GB2004459.0.

* cited by examiner

*Primary Examiner* — Abdullahi Nur
(74) *Attorney, Agent, or Firm* — Oliff PLC

(57) ABSTRACT

Performing multivariate spectral analysis to determine relationships between chemical species in a sample, includes: providing intensity measurement data as plural measured spectra from the sample, each spectrum having unique identifier and intensity values for bins of a binned spectral range; expressing the intensity measurement data as an m×n matrix V, m and n respectively represents number of bins of the spectral range and number of unique identifiers; performing non-negative factorisation of the matrix V to obtain an m×p derived spectra matrix W and a p×n spectral weightings matrix H minimizing an error function |V−WH|, p representing a number of derived spectra and is selected such that the non-negative factorisation over-fits WH to V; identifying correlations between the p derived spectra of the derived spectra matrix W which explain variance in the intensity measurement data; and determining chemical relationships between chemical species in the sample.

10 Claims, 10 Drawing Sheets

MULTIVARIATE SPECTRAL ANALYSIS

TECHNICAL FIELD

The present disclosure relates to performance of multivariate spectral analysis to determine relationships between chemical species in a sample.

CROSS-REFERENCE TO RELATED APPLICATIONS

This specification is based upon and claims the benefit of priority from UK Patent Application Number 2004459.0 filed on 27 Mar. 2020, the entire contents of which are incorporated herein by reference.

BACKGROUND

Multivariate spectral analysis can be used in many areas where information needs to be extracted from a system or process. It is thus relevant to many different technical fields, such as medicine, science and engineering, where insight is needed into components and trends found within input data.

For example, one particular application is the analysis of Raman spectroscopy signals from components of gas turbine engines, e.g. for the detection and study of hot corrosion or sulphidation.

Multivariate data (e.g. spectral mapping data), contains many components. In the case of spectral analysis, these components are fundamental spectra, i.e. spectra which indicate the presence of a particular chemical species (element or compound). The aim of spectral analysis is to isolate and identify these fundamental spectra. There are a number of known approaches to achieve this goal.

First theorised in 1901, Principal Component Analysis (PCA) is a commonly used algorithm for the analysis of multivariate data. It provides a transformation of the original data into a new coordinate system of principal components, where each component represents a trend within the original data set. This reduces the dimensionality of the data, whilst retaining as much of the variation in the data set as possible. PCA has many advantages. Thus it is computationally light, has a low noise sensitivity, does not require any user input and can be used to group spectra based on their results in a scores plot. The PCA principal components are also orthogonal, whereby the data portrayed in one component are not represented in the others and thus the components are independent.

However, a problem with PCA is that the output, which are component loadings, are not real spectra. They represent rather the summation (both additive and subtractive) of fundamental spectra and so contain negative peaks. This produces physically unrealistic outputs that cannot be easily related to the actual fundamental spectra (and therefore sample composition) without expert prior knowledge of the sample composition. This is not an issue for spectral analysis where the species being studied are well known and quantified. However, for spectral analysis of samples where the sample composition is unknown PCA-derived component loadings can prove impossible to analyse.

These trends must be independent (and therefore orthogonal), thus the next algorithm to be applied must perform an orthogonal reduction in dimensionality.

Other possible techniques for determining independent trends include Principal Component Regression (PCR) and Linear Discriminant Analysis (LDA). PCR is a variant form of PCA and has similar advantages and disadvantages. LDA requires a training set to function adequately, which restricts its applicability.

More recently Non-Negative Matrix Factorisation (NMF) has gained in popularity for multivariate analysis. It was introduced by Lee and Seung in its modern form in 1999 as a method for decomposing mixed images.

For spectral analysis, NMF deconstructs the input data (inputted in matrix form) into two new matrices, which consist of derived spectra and the associated spectral weightings required to reproduce the original data. The derived spectra are constrained to be non-negative, which is a restriction of spectral data. The NMF algorithm therefore performs an optimisation to produce the two output matrices. A primary advantage of NMF is its ability to produce positive outputs, meaning that the derived spectra obtained are physically realistic and therefore interpretable by non-expert users.

However, a problem with NMF on the other hand is that it requires user input. In particular, the number p of derived spectra is user-specified and generally arbitrary. If a high number of derived spectra is chosen, fundamental spectra will be split up across these derived spectra, resulting in multiple derived spectra for one fundamental spectrum. This is over-fitting. Conversely, if a low number is chosen, the derived spectra will combine multiple fundamental spectra. This is under-fitting.

Either way, this affects the practicality of the derived spectra, and so the number of required components p is important. There is currently no way of identifying p correctly, and thus conventionally the success of the NMF algorithm depends on educated guesswork. Unlike PCA, NMF also suffers from a lack of orthogonality between outputs. This means that trends can be spread between multiple recovered outputs.

SUMMARY

The present invention is at least partly based on a realisation that it is possible to combine techniques for determining independent trends, such as PCA, with NMF in such a way as to combat the disadvantages of both techniques, while largely retaining their advantages.

Accordingly, in a first aspect, the present disclosure provides a method of performing multivariate spectral analysis to determine relationships between chemical species in a sample, the species having respective fundamental spectra which contribute to spectra measured from the sample, the method including:

providing intensity measurement data in the form of plural measured spectra from the sample, each measured spectrum consisting of a unique identifier and intensity values for bins of a binned spectral range;

expressing the intensity measurement data as an m×n matrix V, where m is an integer representing the number of bins of the spectral range, and n is an integer representing the number of unique identifiers;

performing non-negative factorisation of the matrix V to obtain an m×p derived spectra matrix W and a p×n spectral weightings matrix H which minimise an error function $|V-WH|$, where p is an integer that represents a number of derived spectra and is selected such that the non-negative factorisation over-fits WH to V;

identifying correlations between the p derived spectra of the derived spectra matrix W which explain variance in the intensity measurement data; and determining chemical relationships between chemical species in the sample from the identified correlations and by associating derived spectra with corresponding fundamental spectra.

Advantageously, the method can produce physically realistic derived spectra without user-input and can help to identify spectral (and therefore sample) trends. In particular, the spectral weightings matrix H contains weightings required to reproduce the original measured spectra from the derived spectra matrix W. H therefore contains trends relating to where derived spectra from W are found spatially on the sample surface. By identifying the trends found in H, spectral trends—and therefore sample trends—can be identified.

The performance of the non-negative factorisation and the identification of correlations are typically implemented by a computer. The provision of the intensity measurement data and the expression of the intensity measurement data as an m×n matrix V may also be computer implemented.

Thus a further aspect of the present disclosure provides a data processing system for performing multivariate spectral analysis to determine relationships between chemical species in a sample, the species having respective fundamental spectra which contribute to spectra measured from the sample, the data processing system including:

a computer-readable medium storing intensity measurement data in the form of plural measured spectra from the sample, each measured spectrum consisting of a unique identifier and intensity values for bins of a binned spectral range; and one or more processors configured operatively connected to the computer-readable medium and being configured to: express the intensity measurement data as an m×n matrix V, where m is an integer representing the number of bins of the spectral range, and n is an integer representing the number of unique identifiers; perform non-negative factorisation of the matrix V to obtain an m×p derived spectra matrix W and a p×n spectral weightings matrix H which minimise an error function |V−WH|, where p is an integer that represents a number of derived spectra and is selected such that the non-negative factorisation over-fits WH to V; and identify correlations between the p derived spectra of the derived spectra matrix W which explain variance in the intensity measurement data; and wherein chemical relationships between chemical species in the sample are identifiable from the identified correlations and by associating derived spectra with corresponding fundamental spectra.

The term "computer readable medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" includes, but is not limited to portable or fixed storage devices, optical storage devices, wireless channels and various other mediums capable of storing, containing or carrying instruction(s) and/or data.

Another aspect of the present disclosure provides a computer program comprising code which, when the code is executed on a computer, causes the computer to: perform the method of the first aspect; a computer readable medium storing a computer program comprising code which, when the code is executed on a computer, causes the computer to:

provide intensity measurement data in the form of plural measured spectra from the sample, each measured spectrum consisting of a unique identifier and intensity values for bins of a binned spectral range;

express the intensity measurement data as an m×n matrix V, where m is an integer representing the number of bins of the spectral range, and n is an integer representing the number of unique identifiers;

perform non-negative factorisation of the matrix V to obtain an m×p derived spectra matrix W and a p×n spectral weightings matrix H which minimise an error function |V−WH|, where p is an integer that represents a number of derived spectra and is selected such that the non-negative factorisation over-fits WH to V; and identify correlations between the p derived spectra of the derived spectra matrix W which explain variance in the intensity measurement data;

wherein chemical relationships between chemical species in the sample are identifiable from the identified correlations and by associating derived spectra with corresponding fundamental spectra.

Another aspect of the present disclosure provides a computer readable medium storing the computer program of the previous aspect.

Optional features of the present disclosure will now be set out. These are applicable singly or in any combination with any aspect of the present disclosure.

The plural measured spectra from the sample may be from respective and different locations on the sample.

The correlations may be identified by: performing principle component analysis of the n columns of the spectral weightings matrix H, and identifying the correlations between the p derived spectra of the derived spectra matrix W on the basis of the respective contributions of the p derived spectra to selected principle components resulting from the principle component analysis. Alternatively, however, other possible techniques for identifying the correlations include PCR and LDA.

The spectra may be Raman spectra, the binned spectral range being a binned wave number shift range.

The sample may be a component of a gas turbine engine, such as a combustor, a turbine blade or a turbine vane.

The chemical species may be corrosion and/or oxidation products.

The method may further include a preliminary step of performing spectroscopy (e.g. Raman spectroscopy) to obtain the intensity measurement data. When the sample is a component of an aero gas turbine engine, the preliminary step of performing spectroscopy can advantageously be performed with the engine mounted on-wing, e.g. using a Raman spectroscopy probe which is deployable in situ.

BRIEF DESCRIPTION

Embodiments of the present disclosure will now be described by way of example with reference to the accompanying drawings in which.

Figure 5A:
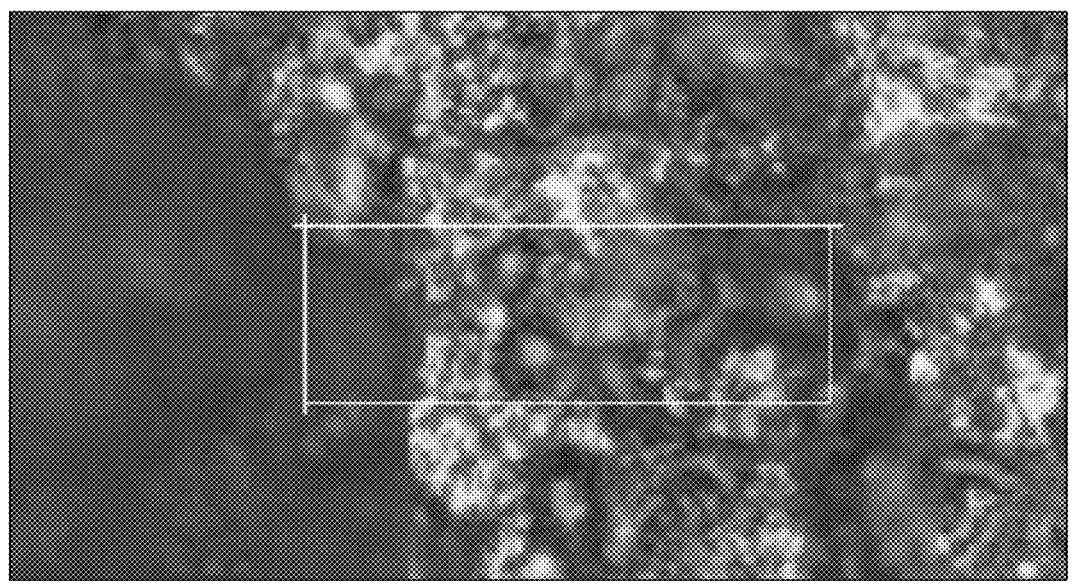
Figure 5B:
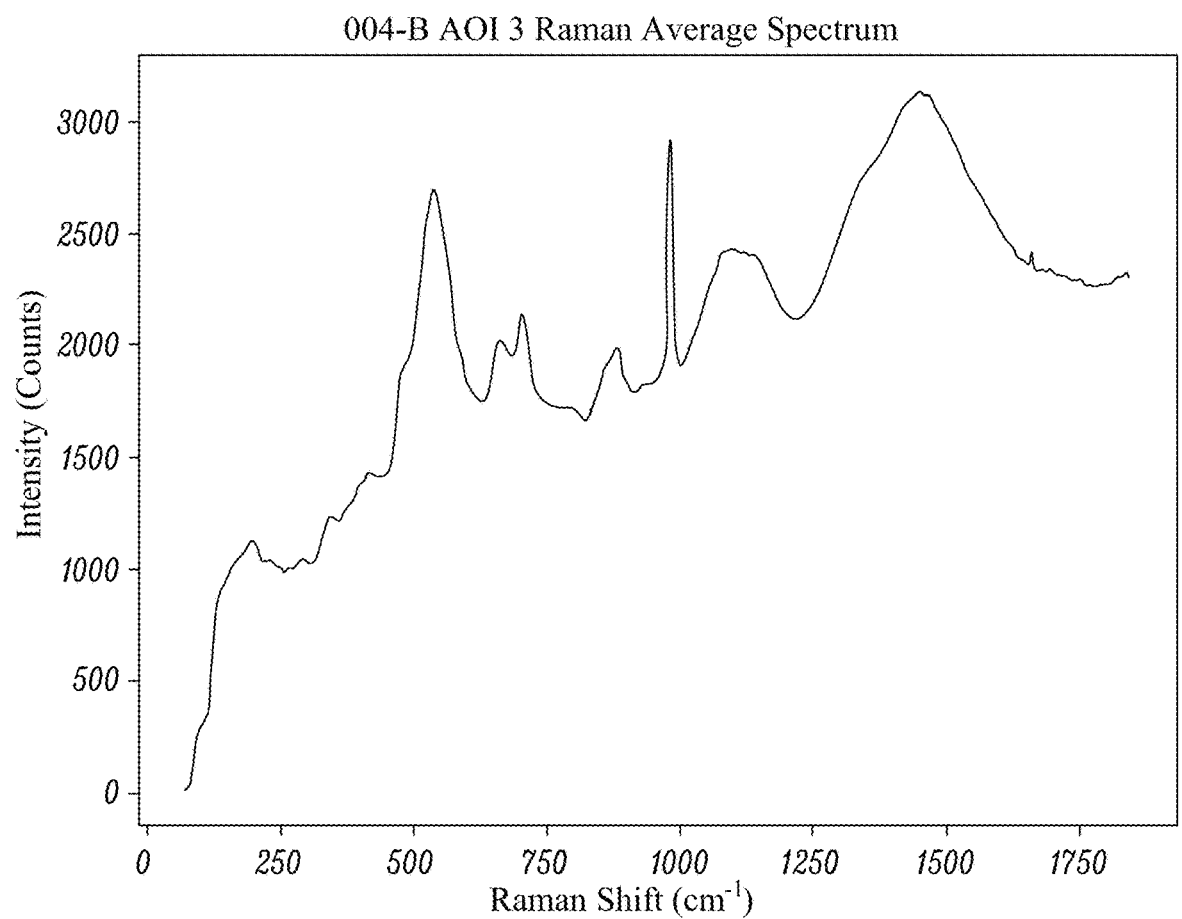

FIGS. 3A-E provide, for the powder sample, percentage variances explained by respective PCA components and also plot the scores of selected NMF derived spectrum for each PCA component;

FIGS. 4A-4L show 12 NMF derived spectra and corresponding heat maps for the rectangular measured area of the powder sample;

FIG. 5A shows a white light image of a corrosion sample, the white rectangle being a mapped area; and FIG. 5B shows an average Raman spectrum for the mapped area; and FIGS. 6A-E provide, for the corrosion sample, percentage variances explained by respective PCA components and also plot the scores of selected NMF derived spectrum for each PCA component.

DETAILED DESCRIPTION

The present disclosure provides a data analysis tool which combines a technique for determining independent trends within NMF. In the following we describe the methodology behind the tool using PCA as an example of the trend-determining technique.

An intensity measurement data set is provided as an m×n matrix V, where m is an integer representing the number of bins of a spectral range, and n is an integer representing a number of unique identifiers for plural measured spectra from a sample. Each column of the matrix thus represents a given measured spectrum. An arbitrarily large number of derived spectra are extracted from the matrix V using an NMF algorithm. Two output matrices are recovered: one is an m×p derived spectra matrix W and the other is an associated p×n spectral weightings matrix H. The number p of derived spectra, while arbitrary, is selected to ensure that the product WH over-fits to V. W and H are determined in the NMF algorithm by minimising a suitable error function $|V-WH|$, such as $|V-WH|_F$.

PCA is then performed upon the spectral weightings of matrix H, to determine where the maximum variance lies. To understand the rationale behind this approach, consider the following: if the spectral composition of an analysed sample were randomly distributed, then the spectral weightings would also be randomly distributed. In such a situation there would be no distinguishable trends in the distribution of the spectral weightings. However, if this is not the case then there will be trends in the distribution of the spectral weightings. In reality, measurements from real samples do display trends in the distribution of chemical species (and therefore of fundamental spectra) and therefore also show trends in the distribution of the spectral weightings.

PCA identifies trends and variance within data sets and can therefore be applied to the spectral weightings recovered from NMF. Consequently, the PCA analysis of the spectral weightings can generate a PCA score for each derived spectrum. This PCA score shows how much each derived spectrum contributes to a particular PCA component.

If a derived spectrum contributes most to the variance within a particular PCA component then it will have a large PCA score (positive or negative). On the other hand, if the derived spectrum does not significantly contribute to the PCA component it will have a small absolute PCA score. The results of this PCA analysis of spectral weightings can be visualised on a plot in which, for a particular PCA component, each derived spectrum is plotted at the point on the ordinate corresponding to its PCA score (where the abscissa represents the spectral range).

The PCA scores of spectral weightings are useful because they provide an insight into correlations between derived spectra and therefore the analysed sample. For example, when two derived spectra are often found together, they will both have large PCA Scores (both positive or both negative), and when actively not found together, they will have opposing sign PCA scores. If they are non- or randomly-contributing derived spectra they will have near zero PCA scores.

The approach of combining NMF with PCA also addresses the problem of how to determine in advance the number of derived spectra for the NMF. In particular, the user-defined number of derived spectra can be set to a large number to force over-fitting. In such a situation, those derived spectra which are merely noise or non-specific background spectra will be found with near zero PCA scores as they do not contribute to the result. Where the over-fitting has resulted in multiple similar derived spectra representing one fundamental spectrum then these "copies" will be highly correlated. Thus they will have large absolute PCA scores of the same sign, allowing the "copies" to be identified.

In addition, an advantage of the physically realistic derived spectra produced by NMF is that they can be easily compared to literature fundamental spectra. Together with the insight into trends in the data provided by the PCA scores, this facilitates identification of species as well as identification of correlations therebetween.

Next we describe two experimental investigations of this data analysis tool.

Investigation 1

Methodology

Figure 1:
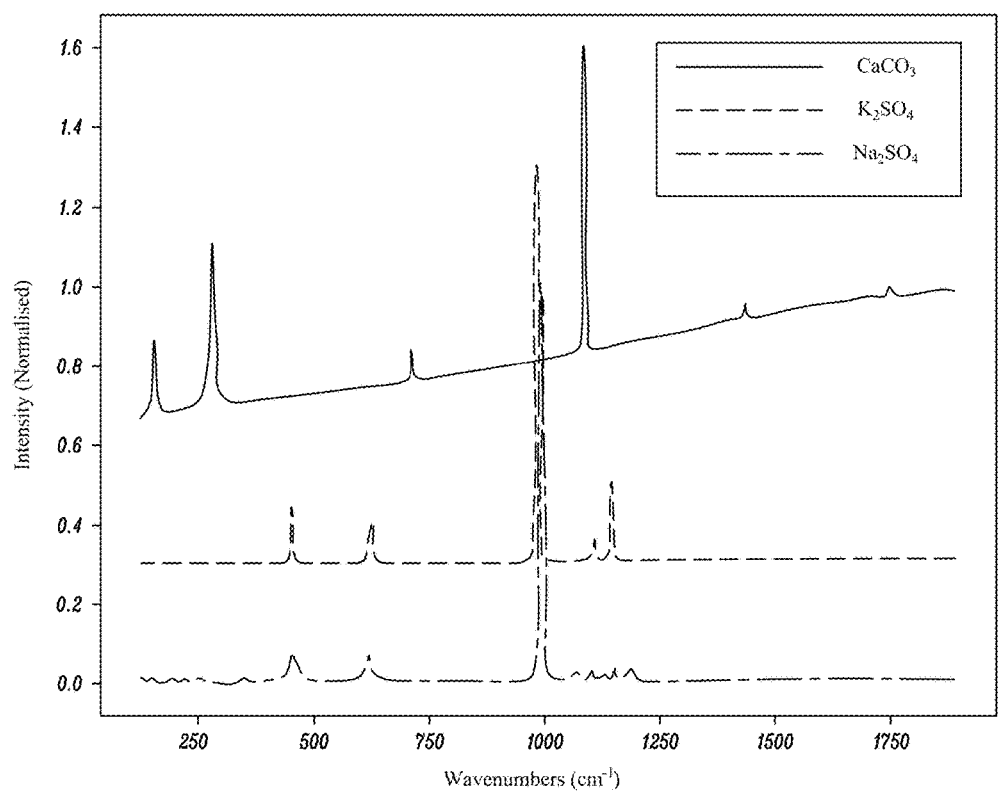
FIG. 1 shows the fundamental Raman spectra normalised to a height of one for Potassium Sulphate ($K_2SO_4$), Calcium Carbonate ($CaCO_3$) and Sodium Sulphate ($Na_2SO_4$)

A sample was prepared to demonstrate the analytical approach. Three powdered chemical compounds were arranged in a sample tray, such that there were two specific regions. A mix of Potassium Sulphate ($K_2SO_4$) and Calcium Carbonate ($CaCO_3$) was on one side, whilst just Sodium Sulphate ($Na_2SO_4$) was on the other side. All the powders had a purity of at least 99%. FIG. 1 shows the fundamental spectra of the three compounds (collected from the individual powder samples by Raman spectroscopy). The similarities between the spectra for Potassium Sulphate and Sodium Sulphate can be noted, although there is a difference in peak position around 990 $cm^{-1}$. These compounds were chosen as commonly occurring compounds found in gas turbine engines linked to corrosion and degradation. Therefore, their detection and trends in their appearance are useful for determining the appearance or likelihood of corrosion within an engine.

Figure 2A:
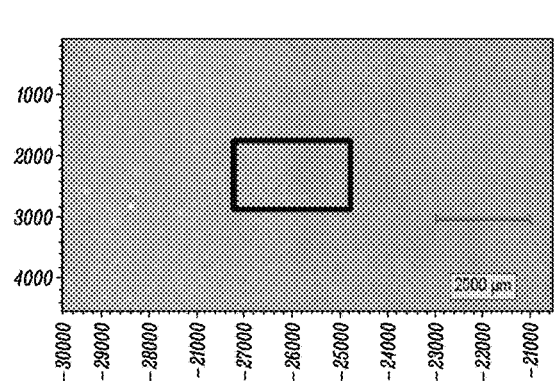
FIG. 2A shows a white light image of a powder sample, the black rectangle being a mapped area having a mix of Potassium Sulphate and Calcium Carbonate on the left hand side, Sodium Sulphate on the right, and a small section in the middle containing all three chemicals.

Using a Renishaw in Via Rama spectrometer, 1296 spectra were measured by Raman spectroscopy at regular positions on the sample forming a rectangular 72×18 array and mapping both regions of the sample area. The area of the array is shown in FIG. 2A.

Figure 2B:
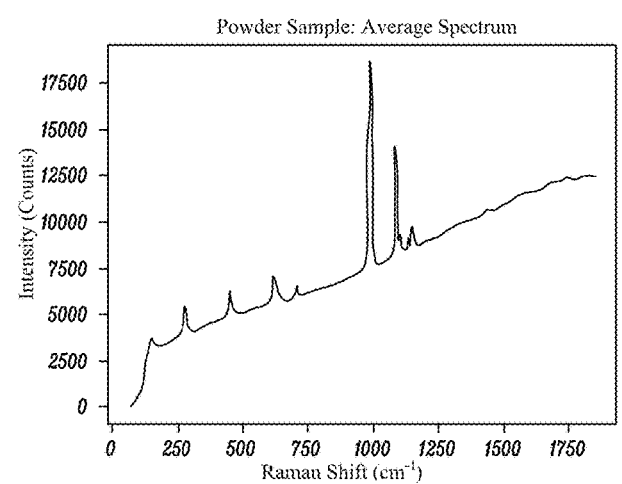
FIG. 2B shows an average Raman spectrum for the mapped area.
Figure 3A:
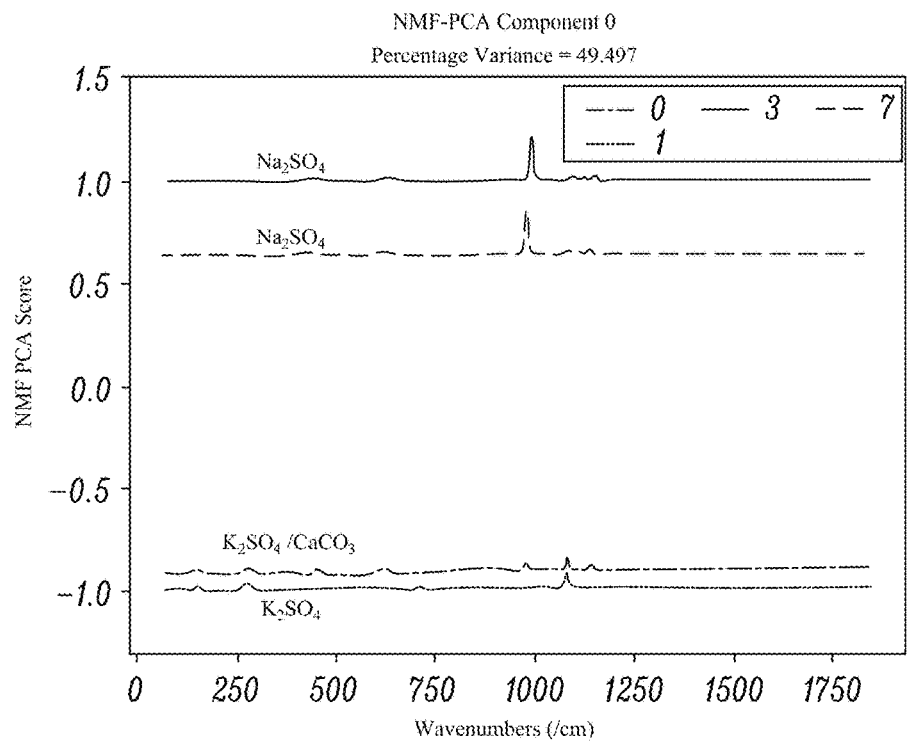
Figure 3B:
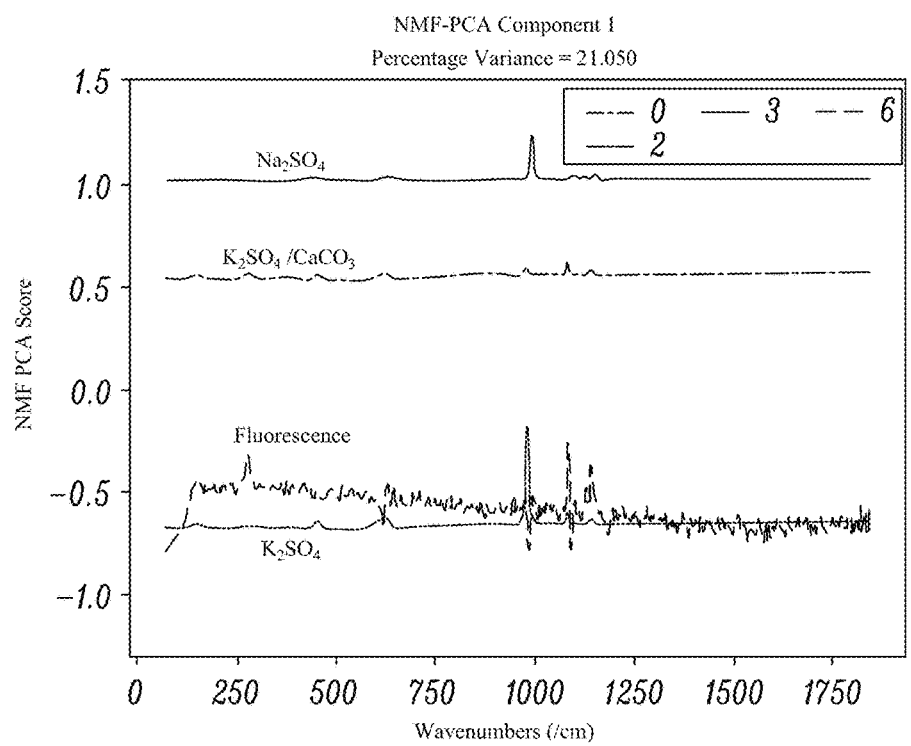
Figure 3C:
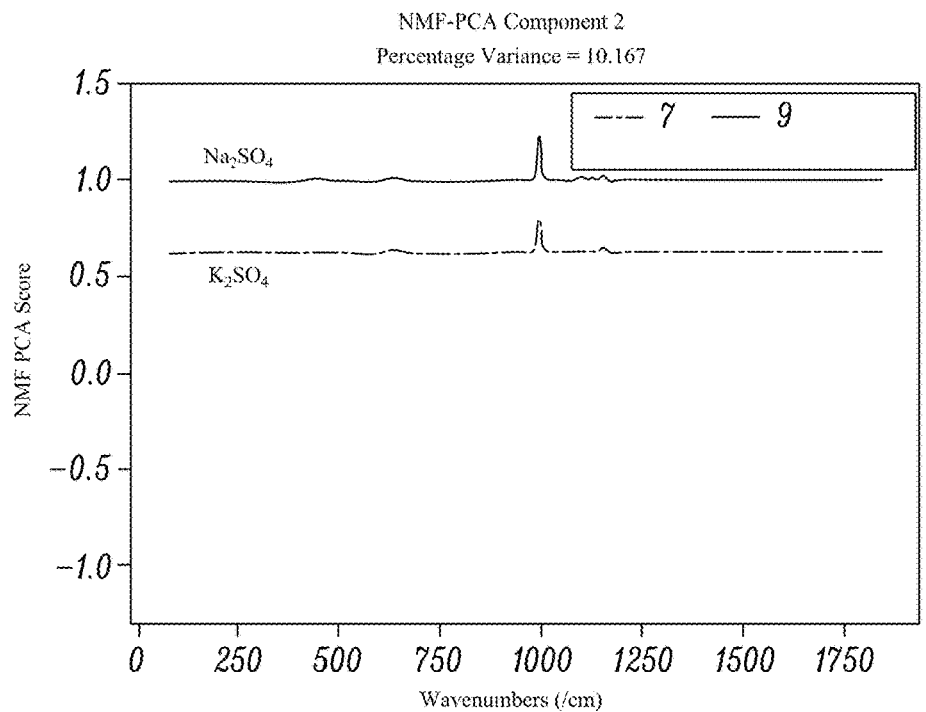
Figure 3D:
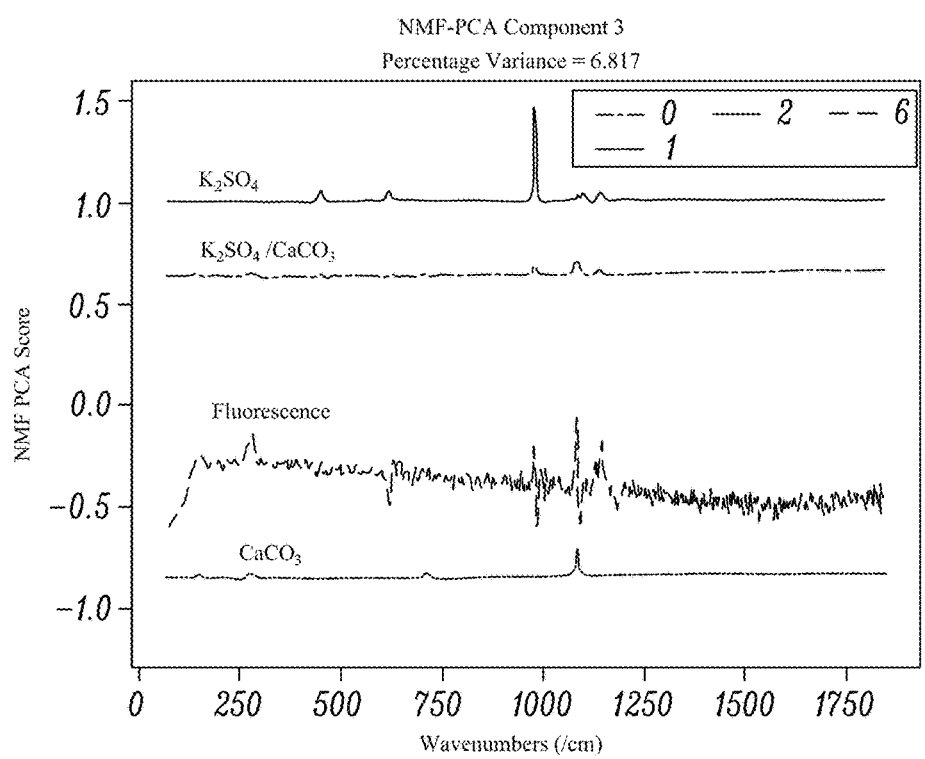
Figure 3E:
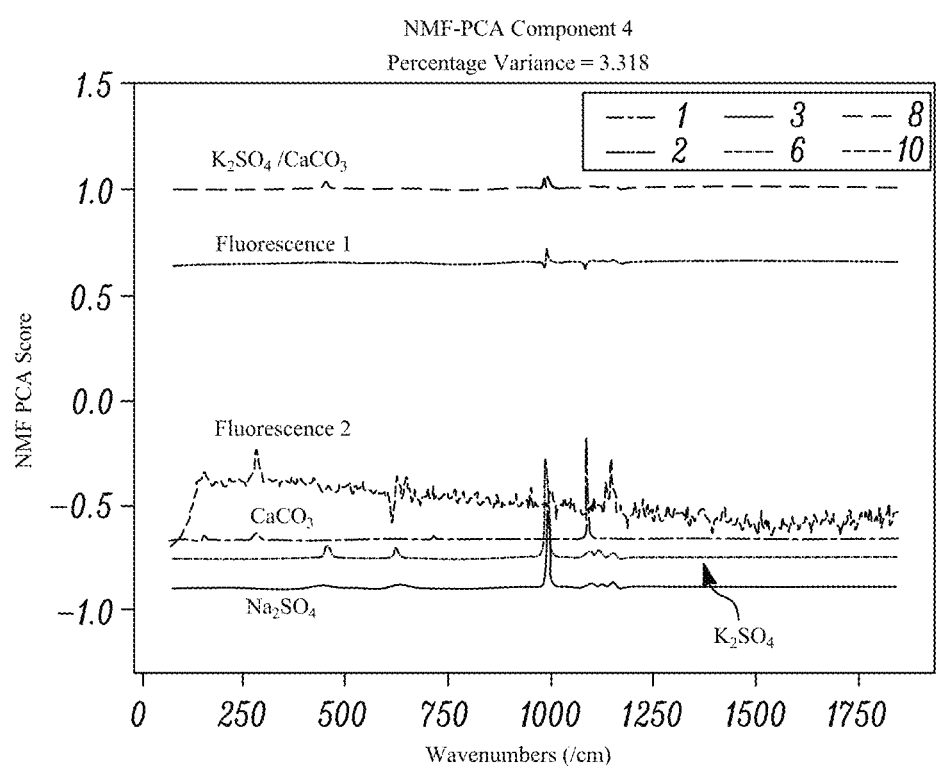
Figure 4A:
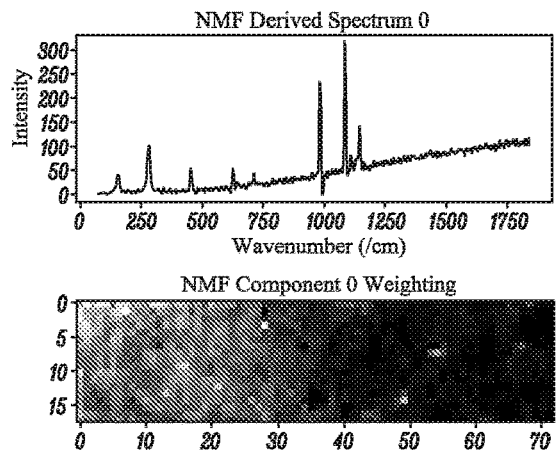
Figure 4B:
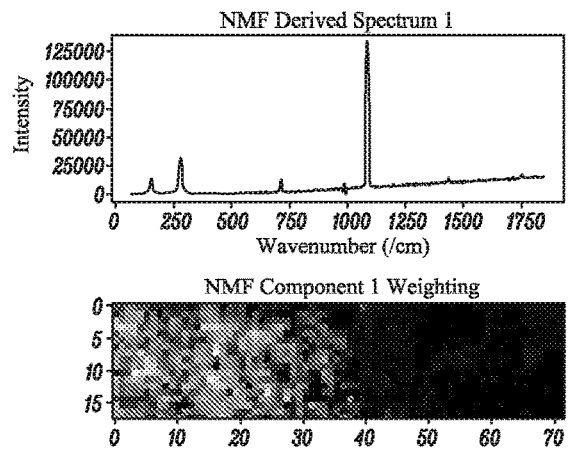
Figure 4C:
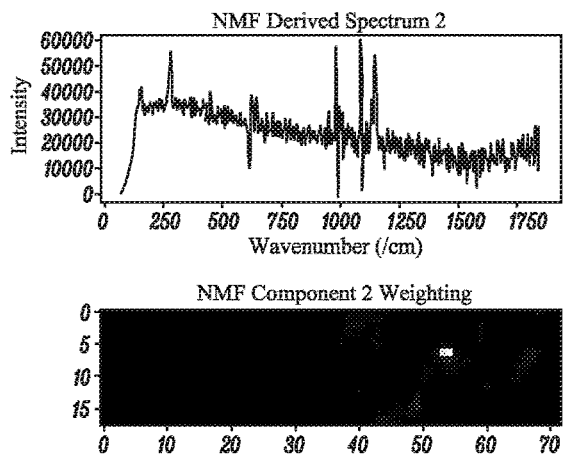
Figure 4D:
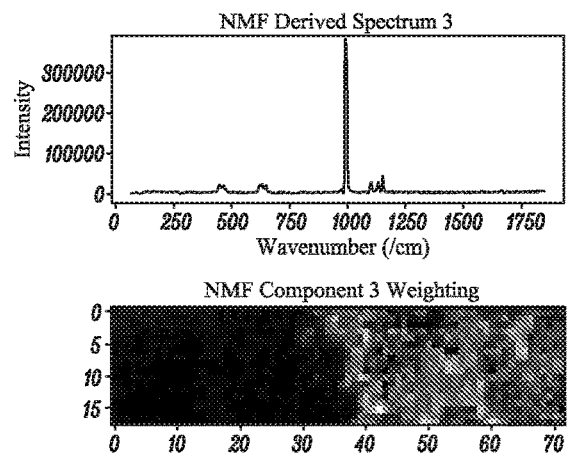
Figure 4E:
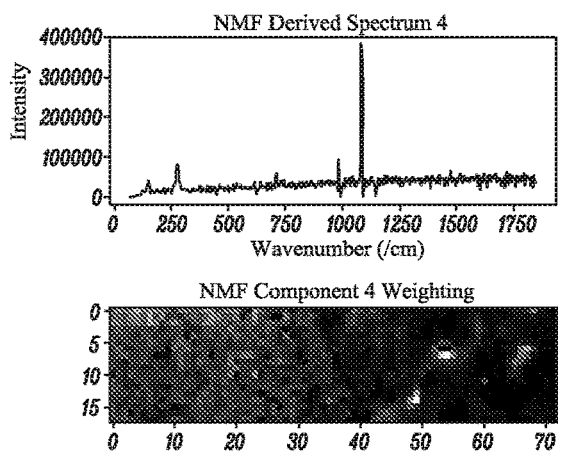
Figure 4F:
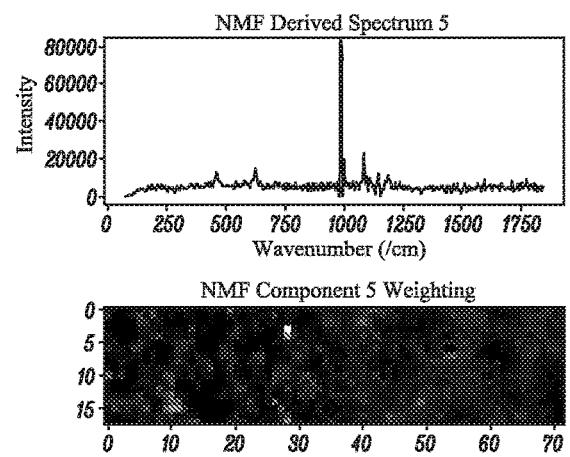
Figure 4G:
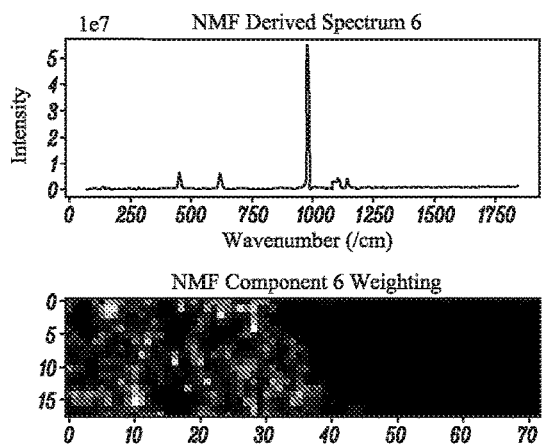
Figure 4H:
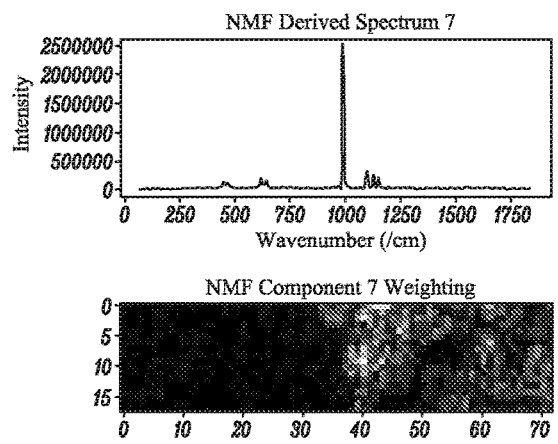
Figure 4I:
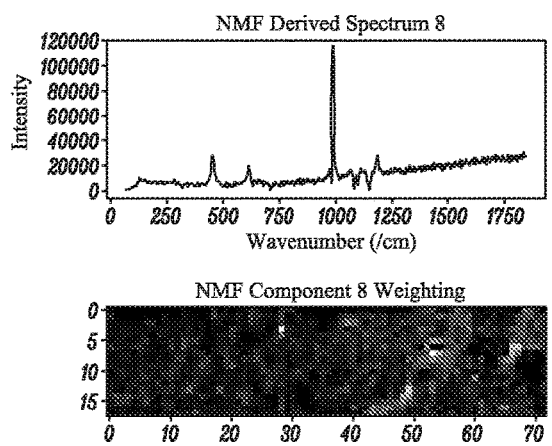
Figure 4J:
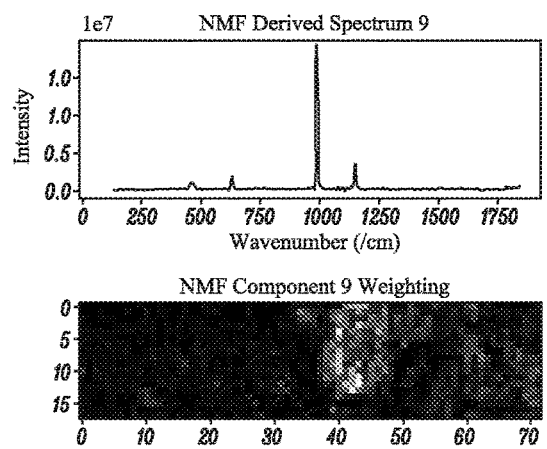
Figure 4K:
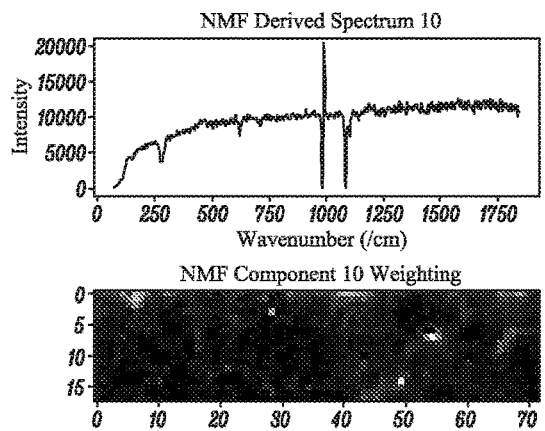
Figure 4L:
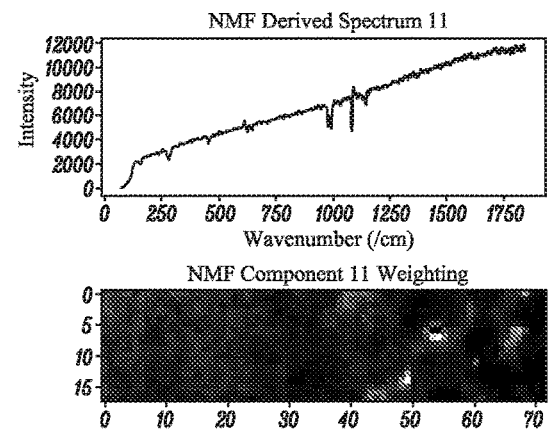

Each measured spectrum covered the same spectral range divided into the sane number of bins. The average spectrum (shown in FIG. 2B) contains 12 or more individual peaks, and any analysis of this data must include the separation of these peaks into their components.

Without prior knowledge of the sample, it would be difficult to match these peaks to literature spectra, i.e. it is difficult to determine whether the peaks are a result of 12 compound "fingerprints" with one peak each, or one compound with 12 peaks, or something in between. Individual spectra taken from the map data can be analysed, but this would be immensely time-consuming. However, the data analysis tool of the present disclosure, which combines NMF and PCA, is able to usefully analyse the spectra from the sample. In particular, we predict that the tool should be able to identify the following trends:

Potassium Sulphate and Calcium Carbonate are found together.

These two chemicals are found where Sodium Sulphate is not found.

In the middle of the sample there is some mixing of the powders, and therefore there may be occasions where a combination of any of the three chemicals may be found.

Analysis Technique and Procedure

The intensity measurements for the bins from the measured spectra were arranged in an m×n matrix V as described above. NMF was performed using 12 derived spectra, i.e. by setting p to a value of 12 for the m×p derived spectra matrix W and the p×n spectral weightings matrix H which are the outputs of the NMF. PCA was then performed on the spectral weightings matrix H.

Trends (i.e. PCA components) were then extracted which explained certain percentages of the variance in the dataset. These trends are visualised graphically in the plots shown in FIGS. 3A-E. Each NMF derived spectrum has a score within each PCA component, which corresponds to how much that NMF derived spectrum contributes to that trend. Highest contributing spectra have large absolute scores at or close to +1 or −1, whilst components which do not contribute have scores at or close to zero.

In FIGS. 3A-E, only the derived spectra which contributed most to each particular trend are plotted (i.e. spectra which have an NMF-PCA score of greater than +/−0.5). This is to show the highest contributing spectra for each trend, and remove (filter out) extraneous data.

Each of FIGS. 3A-E also provides the percentage variance explained by that PCA component, which can be interpreted as a measure of the significance of a particular trend. Trends displaying less than 3% of the total variance have not been included for brevity.

For reference, all 12 of the derived spectra, along with their corresponding heat maps for the rectangular measured area, are displayed in FIGS. 4A-4L.

Results

Trend 0 (FIG. 3A):
The highest rated spectrum in this PCA component is a Sodium Sulphate spectrum (with a NMF-PCA score of 1.0), and below it lies a copy with a score of approximately 0.6.

The lowest rated spectra in this component are Calcium Carbonate (with a score of −1), Potassium Sulphate (with a score of −0.6), and a mixed spectrum containing components of both Calcium Carbonate and Potassium Sulphate with a score of −0.7.

This therefore shows that where we see Sodium Sulphate, we actively do not find Potassium Sulphate and Potassium Sulphate. Trend 0 explains 49.5% of the variance in the data set, and therefore is the predominant PCA component.

Trend 1 (FIG. 3B):
The highest rated spectrum is again Sodium Sulphate, and this time the second rated spectrum with a score of approximately 0.55 is a mixed spectrum of Calcium Carbonate and Sodium Sulphate. We also see a spectrum for Potassium Sulphate with a score of approximately −0.65. Therefore, when we see Sodium Sulphate, on 21.0% of occasions we also see Calcium Carbonate, and we do not see Potassium Sulphate.

This can be explained by the mixing of the compounds where they meet in the centre of the measurement area, and is consistent with the heat maps for the individual derived spectra in FIG. 4.

There is also a fluorescence spectrum with a score of around −0.8. This spectrum is also shown in FIG. 4 as NMF Derived Spectrum 2, and can be seen to be a point of high intensity, most likely caused by contamination in the sample.

Trend 2 (FIG. 3C):
This PCA component shows a similar response to Trend 1. The highest rated spectrum is Sodium Sulphate, and next, with a score of 0.5, is Potassium Sulphate.

There are no lower rated spectra. Therefore, approximately 10.2% of the data set contains regions where we see Sodium Sulphate and Potassium Sulphate together.

Trend 3 (FIG. 3D):
Potassium Sulphate is the highest rated spectrum, Calcium Carbonate is the lowest rated spectrum, whilst in between are a "mix" spectrum having peaks from both Potassium Sulphate and Calcium Carbonate and another background spectrum which is the same as that featured in Trend 1 caused by fluorescence.

Trend 3 is due to the experimental environment. When the Potassium Sulphate and Calcium Carbonate were mixed together, they did not form a completely homogenous mixture. There are instead patches of just Potassium Sulphate, and patches of just Calcium Carbonate. This explains the highest rated and lowest rated spectra. By contrast, points in the sample where the two compounds were found in equal measure were rarer, as represented by the lower rating of the mix spectrum than for Potassium Sulphate alone.

Trend 3 is uncommon, with a percentage variance of only 6.8%.

Trend 4 (FIG. 3E):
The highest-rated spectra here are a fluorescence spectrum (labelled Fluorescence 1) and a mixed spectrum. These are highly rated, in comparison to the low ratings of the spectra corresponding to Sodium Sulphate, Potassium Sulphate, Calcium Carbonate and a second fluorescence spectrum (labelled Fluorescence 2).

This demonstrates the spatial independence of contamination (inferred from the fluorescence spectra) from the main chemical compounds of the sample, i.e. they are not related to these compounds.

The highly ranked mixed spectrum can be explained as showing that where the compounds are mixed, they are not found in their pure forms, as is to be expected.

In any event, the low percentage variance (3.3%) for Trend 4 means that it is found infrequently in the data set.

Discussion

All the predicted trends for the experimental data were observed in the actual PCA components discussed above. The only trend observed but not predicted was that of the fluorescence (i.e. contamination) observed in Trends 1 and 3. However, this is explainable by the 99% purity of the powders which still allows for contamination. In addition, the Raman spectroscopy was not performed in a clean room, so other sources of contamination are also possible.

Identification of these trends would not be possible from conventional NMF or PCA. Being able to relate the appearance of one chemical species to the appearance (or disappearance) of another is a valuable insight into the chemical reaction history of a sample.

Investigation 2

Methodology

A sample was cut-off from a Rolls-Royce XWB turbine blade and subjected to artificial corrosion intended to mimic at least some of the features of in-service corrosion. The sample material was CMSX-4 (a rhenium-containing, nickel-base alloy from Cannon Muskegon Corporation), and it was salt-sprayed, then thermally cycled at 700° C. for 200 hours in a sulphurous gas environment.

Using a Renishaw in Via Rama spectrometer, 176 spectra were measured by Raman spectroscopy at regular positions on the sample forming a rectangular 22×8 array and mapping both regions of the sample area. The map location is shown in a white-light image of FIG. 5A, and the average Raman spectrum is displayed in FIG. 5B. Each measured spectrum covered the same spectral range divided into the same number of bins.

Analysis Technique and Procedure

The intensity measurements for the bins from the measured spectra were arranged in an m×n matrix V. NMF was performed using 10 derived spectra, i.e. by setting p to a value of 10 for the m×p derived spectra matrix W and the p×n spectral weightings matrix H which are the outputs of the NMF. PCA was then performed on the spectral weightings matrix H to extract trends (i.e. PCA components) which explained certain percentages of the variance in the dataset. These trends are visualised graphically in the plots shown in FIGS. 6A-E along with the respective percentage variances explained by the trends. As in the plots of FIGS. 3A-E, each NMF derived spectrum has a score within each PCA component, which corresponds to how much that NMF derived spectrum contributes to that trend. Highest contributing spectra have large absolute scores at or close to +1 or −1, whilst components which do not contribute have scores at or close to zero. This time, the filter applied for Investigation 1 was not applied, as the results here are more uncertain and all spectral data could be of interest.

Results

Figure 6A:
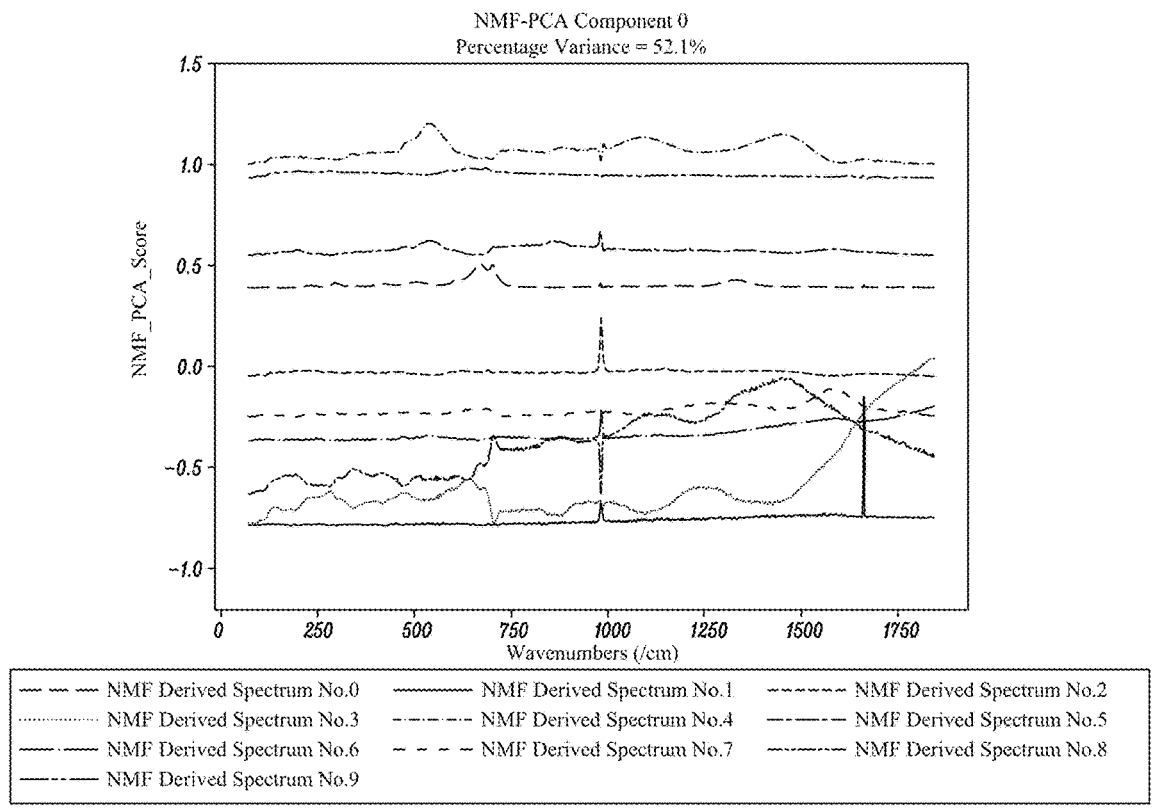
Figure 6B:
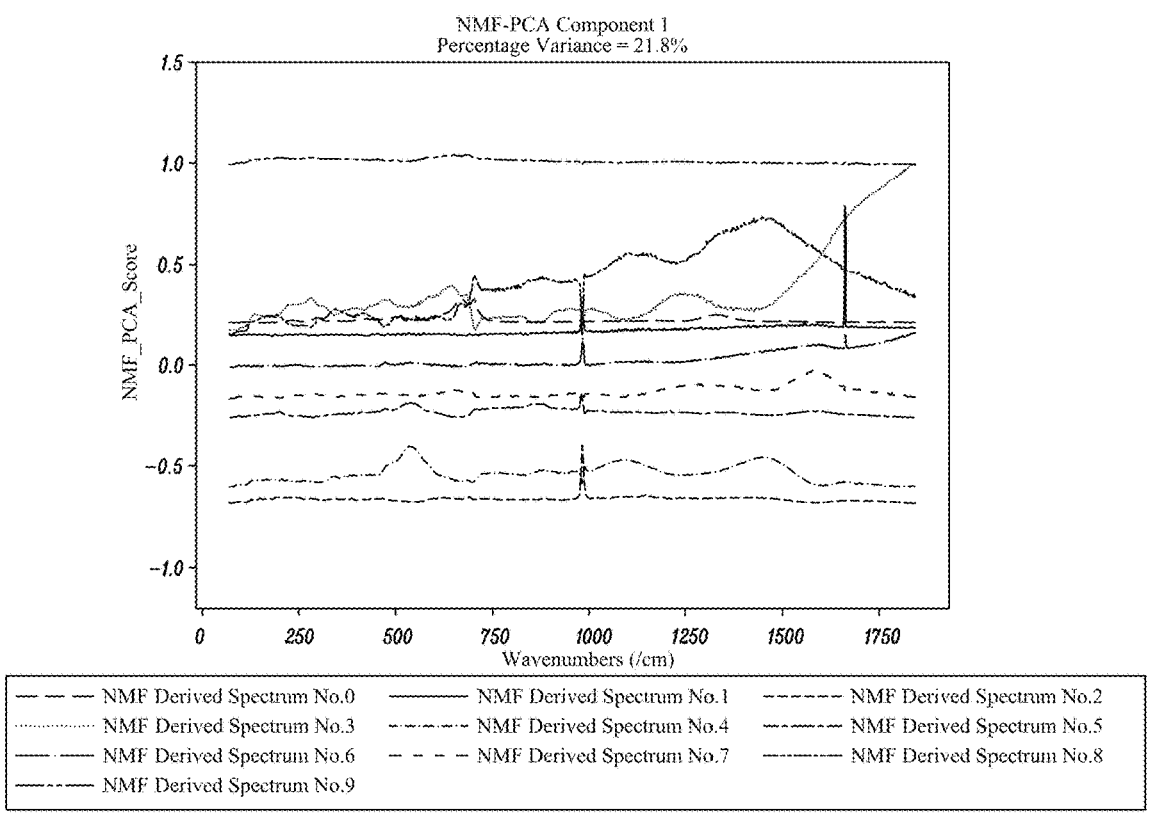
Figure 6C:
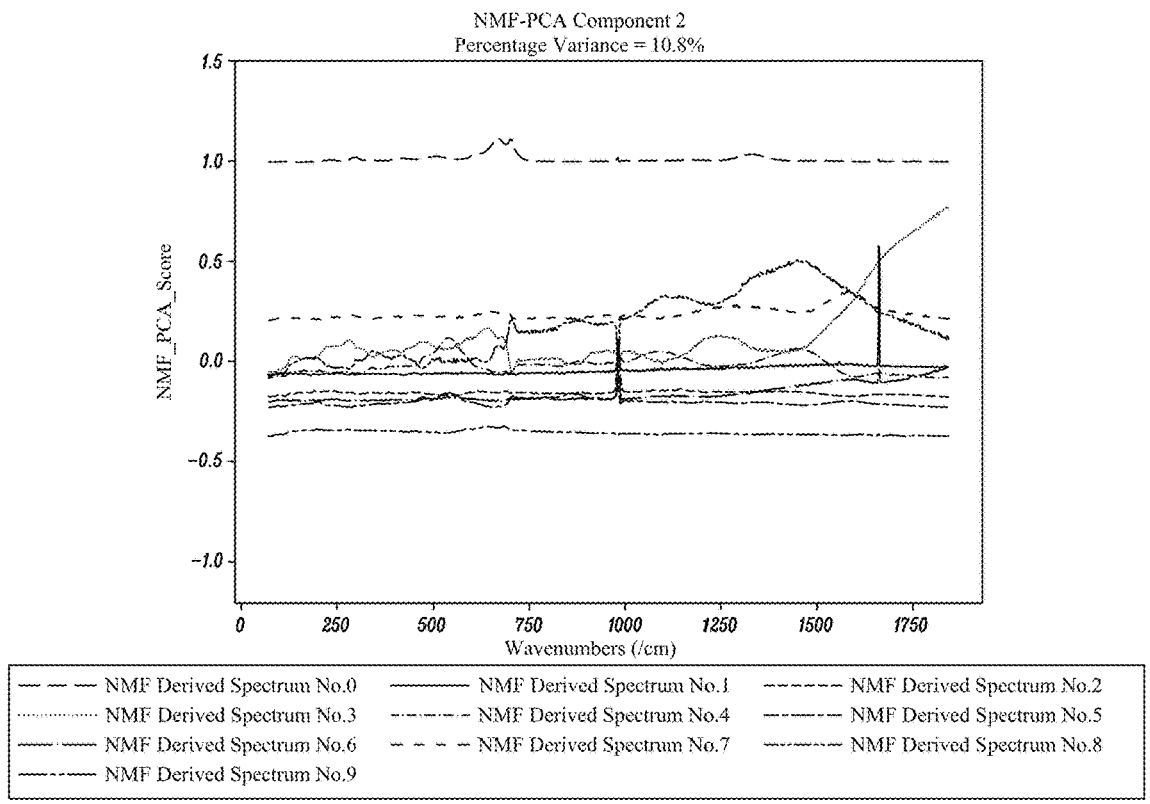
Figure 6D:
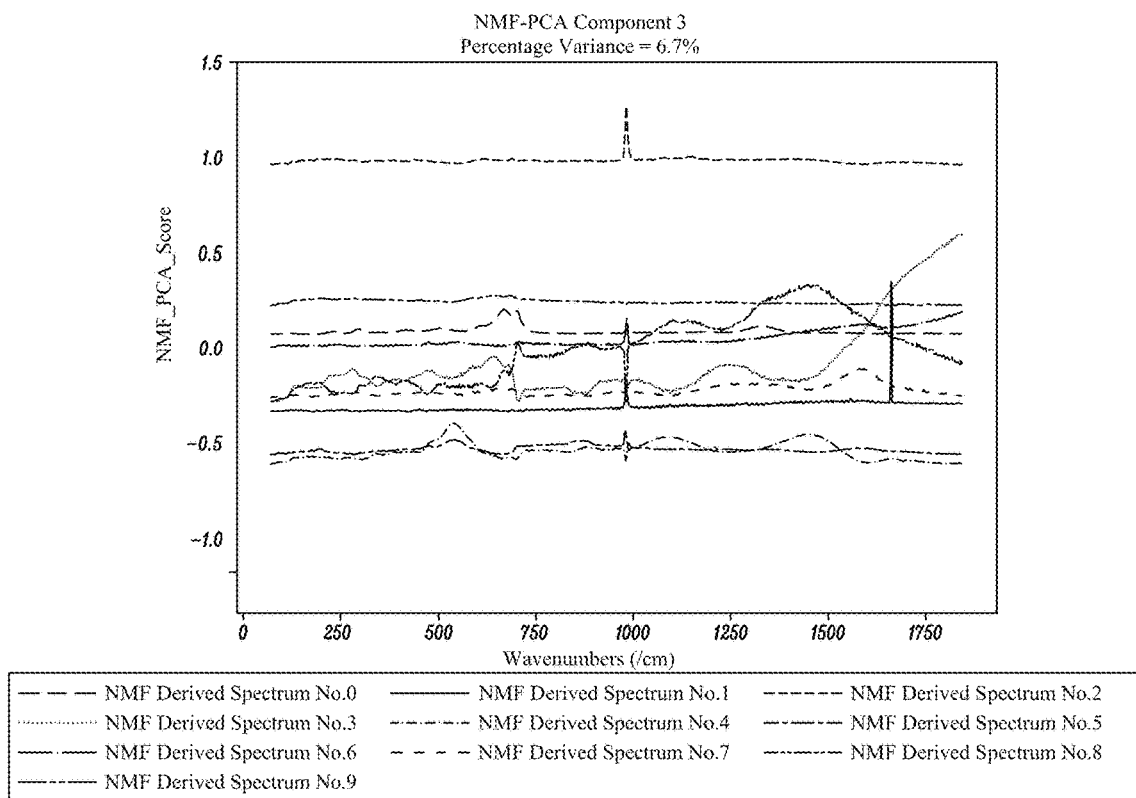
Figure 6E:
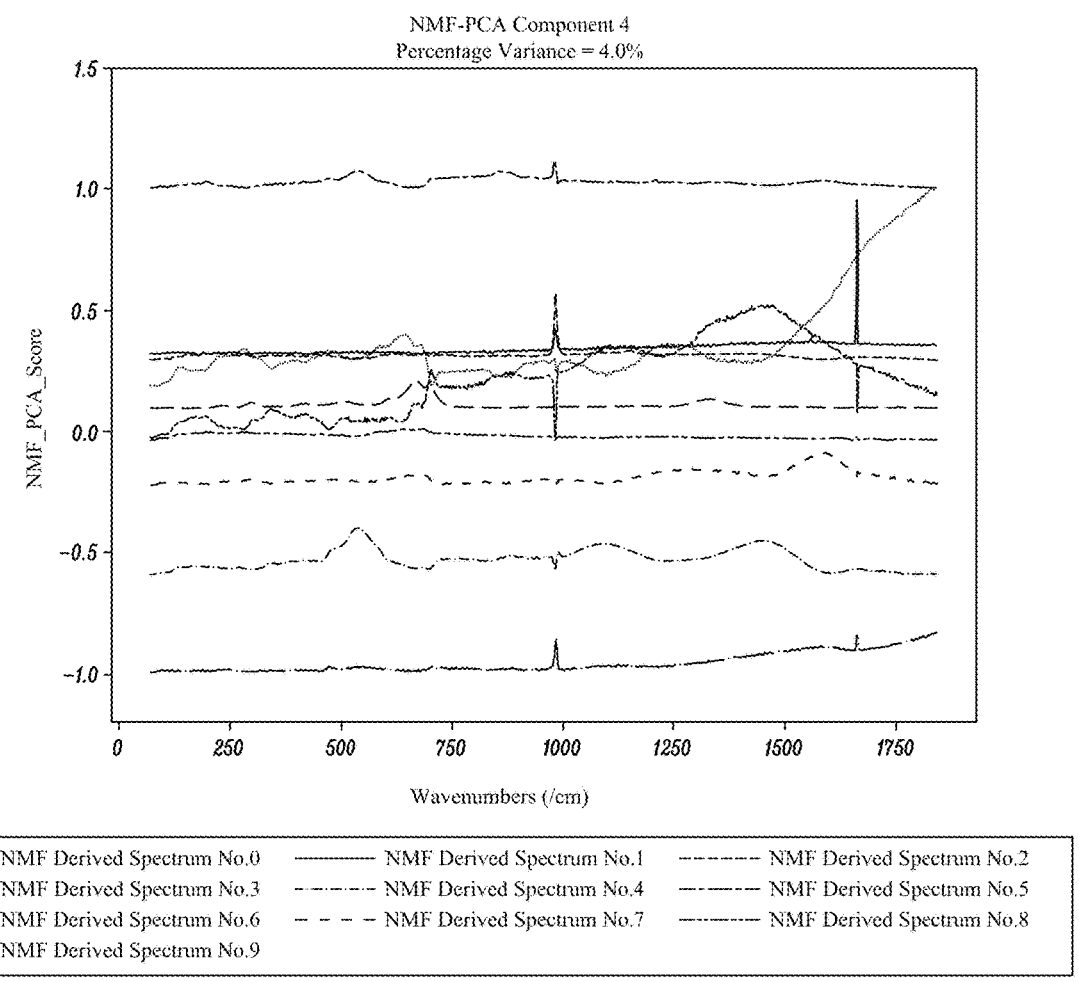

Trend 0 in FIG. 6A explains over 52% of the variance in the data set, whilst Trend 4 in FIG. 6E only explains 4.0%. Trends which explain less than 3% of the variance have not been included for brevity.

Thus looking first at Trends 0 and 1 in FIGS. 6A and B with respective variances of 52.1% and 21.7%, the two main components are NMF Derived Spectra 2 and 6 respectively. By comparison with literature spectra, the Derived Spectrum 2 spectrum is confirmed to be the Raman spectrum for Nickel Oxide, NiO. Derived spectrum 6 is as yet unidentified, but is suspected to be at least in part the Raman spectrum for Sodium Chloride, NaCl. From Trend 0 we can infer that both spectra commonly appear together. However, from Trend 1, we also see Derived Spectrum 6 (or rather, the compound responsible for it) by itself without Derived Spectrum 2 for Nickel Oxide. This could be explained as a chemical relationship, such as the compound responsible for Derived Spectrum 6 being intrinsically linked to the production, or destruction, of Nickel Oxide.

Another relationship can be inferred from Trend 2 (variance of 10.8%) of FIG. 6C. Derived Spectrum 7 is at a height of 1, meaning it is the most contributing to the trend. Nearly all the other spectra are then found at around zero, meaning they do not contribute to this trend much, if at all. The only spectra with meaningful relationships may be Derived Spectra 3 and 5 found at approximately 0.2 and −0.3. Derived Spectrum 5 is (by comparison with literature) Nickel Oxide, whilst Derived Spectrum 3 is as yet unidentified. Therefore, we can determine that the relationship between the compounds responsible for Derived Spectra 3 and 5 and all other compounds is arbitrary because their relative scores are so close, both to each other and to zero. To elaborate further: the presence of the compound responsible for Derived Spectrum 7 (with a relative score of +1.0) has no impact on the presence—or absence—of any other compounds (all with scores close to zero), except that it is loosely linked to the presence of Nickel Oxide (Derived Spectrum 5, with a score of +0.2) and loosely linked to the absence of one other compound (Derived Spectrum 3, with a score of −0.3).

Another relationship is shown in Trend 3 (variance of 6.7%) of FIG. 6D. The top spectrum, Derived Spectrum 4, at a height of 1 is a near perfect match for a literature spectrum of sodium sulphate, $Na_2SO_4$. The majority of the other spectra are found around zero, although Derived Spectrum 6 is again slightly higher in the plot (i.e. Derived Spectrum 4 is loosely linked to the presence of Sodium Sulphate) and two spectra, Derived Spectra 2 and 3 are slightly lower in the plot, meaning they are loosely linked to the absence of Sodium Sulphate.

DISCUSSION

Being able to extract spectra from a dataset, which are both physically realistic and orthogonal, means identification of these spectra (by both comparison with literature spectra and expert user knowledge) becomes much easier. Moreover, once chemical species are identified, knowing how they are related provides useful insight into corrosion mechanisms.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. A method of performing multivariate spectral analysis to determine relationships between chemical species in a sample, the species having respective fundamental spectra which contribute to spectra measured from the sample, the method including:

providing intensity measurement data acquired via a Raman spectrometer in the form of plural measured Raman spectra from the sample, each measured Raman spectrum consisting of a unique identifier and intensity values for bins of a binned spectral range;

providing one or more processors configured to: express the intensity measurement data as an m×n matrix V, where m is an integer representing the number of bins of the spectral range, and n is an integer representing the number of unique identifiers, perform non-negative factorisation of the matrix V to obtain an m×p derived spectra matrix W and a p×n spectral weightings matrix H which minimise an error function |V−WH|, where p is an integer that represents a number of derived spectra and is selected such that the non-negative factorisation over-fits WH to V; and identify correlations between the p derived spectra of the derived spectra matrix W which explain variance in the intensity measurement data;

expressing the intensity measurement data via the one or more processors as the matrix V;

performing non-negative factorisation via the one or more processors of the matrix V to obtain the m×p derived spectra matrix W and the spectral weightings matrix H which minimise the error function |V−WH|;

identifying correlations via the one or more processors between the p derived spectra of the derived spectra matrix W which explain variance in the intensity measurement data; and determining chemical relationships between chemical species in the sample from the identified correlations and by associating derived spectra with corresponding fundamental Raman spectra.

2. The method of claim 1, wherein the plural measured spectra from the sample are from respective and different locations on the sample.

3. The method of claim 1, wherein the correlations are identified by:

performing principle component analysis of the n columns of the spectral weightings matrix H, and identifying the correlations between the p derived spectra of the derived spectra matrix W on the basis of the respective contributions of the p derived spectra to selected principle components resulting from the principle component analysis.

4. The method of claim 1, wherein the binned spectral range is a binned wave number shift range.

5. The method of claim 1, wherein the sample is a component of a gas turbine engine, a combustor of a gas turbine engine, a turbine blade of a gas turbine engine or a turbine vane of a gas turbine engine.

6. The method of claim 1, wherein the chemical species are corrosion and/or oxidation products.

7. The method of claim 1 further including a preliminary step of performing Raman spectroscopy on a gas turbine engine sample to obtain the intensity measurement data.

8. The method of claim 7, wherein the sample is a component of an aero gas turbine engine, and the preliminary step of performing Raman spectroscopy is performed with the engine mounted on-wing.

9. A data processing system for performing multivariate spectral analysis to determine relationships between chemical species in a sample, the species having respective fundamental spectra which contribute to spectra measured from the sample, the data processing system including:

a computer-readable medium storing intensity measurement data acquired via a Raman spectrometer in the form of plural measured Raman spectra from the sample, each measured Raman spectrum consisting of a unique identifier and intensity values for bins of a binned spectral range; and one or more processors configured operatively connected to the computer-readable medium and being configured to: express the intensity measurement data as an m×n matrix V, where m is an integer representing the number of bins of the spectral range, and n is an integer representing the number of unique identifiers; perform non-negative factorisation of the matrix V to obtain an m×p derived spectra matrix W and a p×n spectral weightings matrix H which minimise an error function $|V-WH|$, where p is an integer that represents a number of derived spectra and is selected such that the non-negative factorisation over-fits WH to V; and identify correlations between the p derived spectra of the derived spectra matrix W which explain variance in the intensity measurement data; and wherein chemical relationships between chemical species in the sample are identifiable from the identified correlations and by associating derived spectra with corresponding fundamental Raman spectra.

10. A non-transitory computer readable storage medium storing a computer program comprising code which, when the code is executed on a computer, causes the computer to:

provide intensity measurement data acquired via a Raman spectrometer in the form of plural measured Raman spectra from the sample, each measured Raman spectrum consisting of a unique identifier and intensity values for bins of a binned spectral range;

express the intensity measurement data as an m×n matrix V, where m is an integer representing the number of bins of the spectral range, and n is an integer representing the number of unique identifiers;

perform non-negative factorisation of the matrix V to obtain an m×p derived spectra matrix W and a p×n spectral weightings matrix H which minimise an error function $|V-WH|$, where p is an integer that represents a number of derived spectra and is selected such that the non-negative factorisation over-fits WH to V; and identify correlations between the p derived spectra of the derived spectra matrix W which explain variance in the intensity measurement data;

wherein chemical relationships between chemical species in the sample are identifiable from the identified correlations and by associating derived spectra with corresponding fundamental Raman spectra.

* * * * *